United States Patent [19]

Williams

[11] 4,176,559

[45] Dec. 4, 1979

[54] MULTI-PURPOSE TOOL

[76] Inventor: James E. Williams, 1318 W. 20th, Hastings, Minn. 55033

[21] Appl. No.: 833,874

[22] Filed: Sep. 16, 1977

[51] Int. Cl.² ............................................ F16H 21/44
[52] U.S. Cl. .................................... 74/102; 308/3 R; 184/100
[58] Field of Search ......................... 74/102, 105, 103; 248/295, 296; 308/3 A, 5 R, 237, 240; 184/100

[56] References Cited

U.S. PATENT DOCUMENTS

| 909,937 | 1/1909 | Rice | 74/105 |
|---|---|---|---|
| 2,589,752 | 3/1952 | Veilleux | 74/102 |
| 2,800,798 | 7/1957 | Korsmo | 74/102 |
| 3,054,645 | 9/1962 | Evans | 308/3 A |
| 3,231,320 | 1/1966 | Krafft | 308/5 R |
| 3,270,591 | 9/1966 | Winter | 308/3 A |

FOREIGN PATENT DOCUMENTS 72497  9/1915  Switzerland ............................ 248/295

*Primary Examiner*—Samuel Scott
*Assistant Examiner*—Wesley S. Ratliff, Jr.
*Attorney, Agent, or Firm*—Paul L. Sjoquist

[57] ABSTRACT

A hand-operated multi-purpose tool mounted on a stand having a projecting support, with a movable tool assembly attached to the support. A pivotal handle is coupled to the tool assembly, the handle reciprocably positioning a plunger having at least one flat edge surface, the plunger passing through a triangular guide member in the tool assembly and being adjustably clamped thereto by means of a clamping plate bearing against the plunger flat surface. A plurality of different tools, jigs and fixtures may be attached to the reciprocable plunger for numerous working functions.

4 Claims, 7 Drawing Figures

MULTI-PURPOSE TOOL

BACKGROUND OF THE INVENTION

The present invention relates to a multi-purpose tool and fixture assembly, and specifically to a hand-operated reciprocable tool having considerable precision at an economical cost.

The invention is particularly adaptable for precision work on miniature workpieces, as for example model work and hand crafting. The invention permits a multiplicity of different tools to be attached to a common tool assembly for accomplishing multiple work functions. Because the invention may be economically produced, it is amenable to precision work at low cost in the hobbyist, electronic and light industrial fields to assist in the construction of miniaturized components and parts.

SUMMARY OF THE INVENTION

A mounting stand having a vertical support is provided for the movable attachment of a tool assembly. The tool assembly includes a pivotable handle coupled to a vertically reciprocable plunger, which plunger has at least one flat edge surface. The plunger is clamped against a triangular groove through the tool assembly by means of a flat bar which is adjustable against the plunger flat surface to provide a variable friction drag against the plunger. The bottom end of the plunger is tapped and hollow for attachment to any of a number of different tool configurations.

In accordance with the teachings of the invention it is a principal object to provide an economical precision tool for permitting accurate and repeatable vertical reciprocation of a tool having negligible lateral movement. It is another object of the invention to provide a tool assembly wherein a plurality of individual tools may be connected for working. It is yet another object of the invention to provide a reciprocable tool having variable drag resistance over its sliding surface to control the tool-moving force over a wide range, which range includes adjustability to provide a fixed vertical clamp.

BRIEF DESCRIPTION OF THE DRAWINGS

The foregoing objects are achieved by the present invention, a preferred embodiment of which will be described hereinafter, and with reference to the appended drawings, in which.

DESCRIPTION OF THE PREFERRED EMBODIMENT

Figure 1:
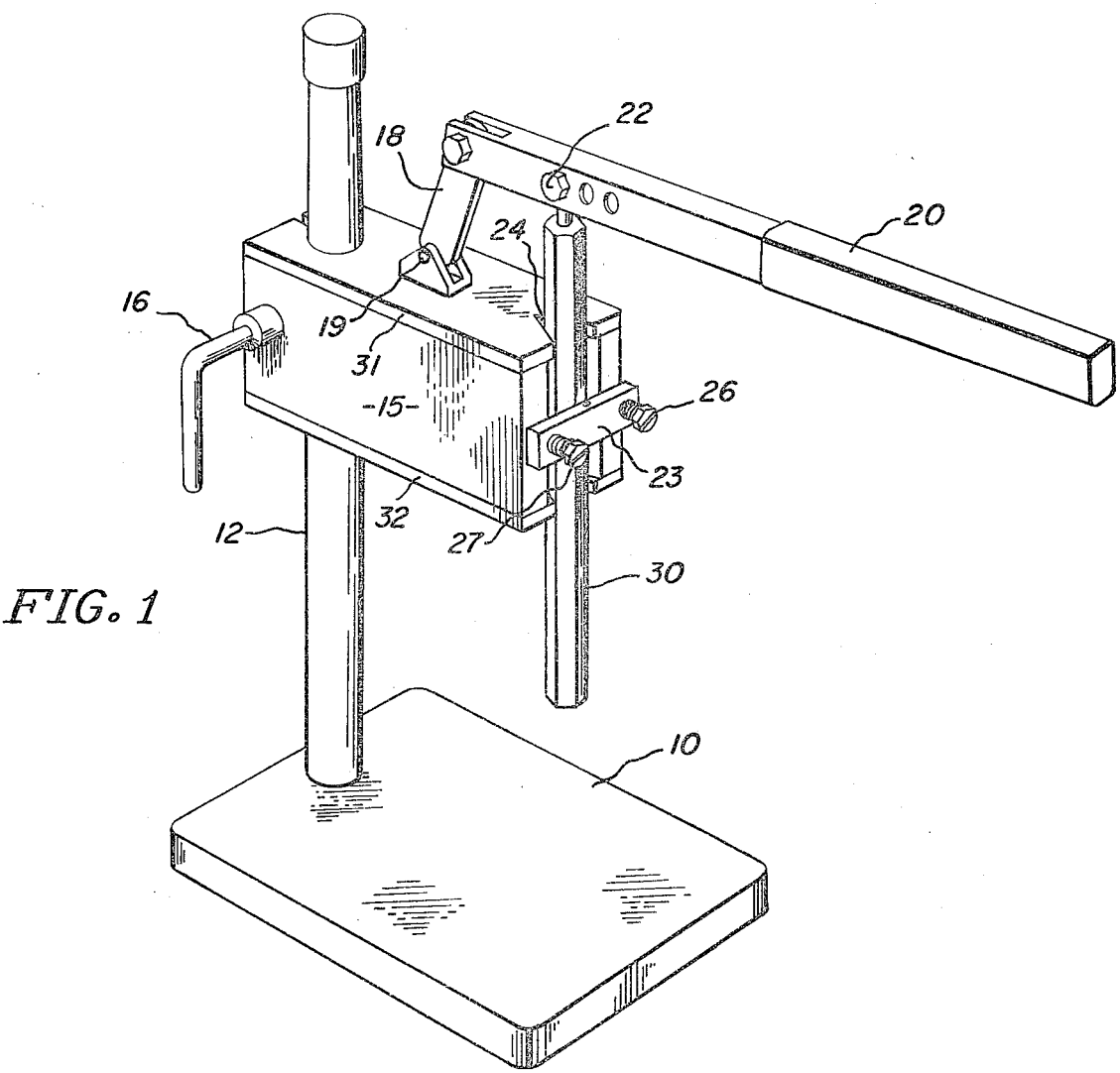
FIG. 1 is an isometric view of the invention.

Referring first to FIG. 1, the invention is shown in isometric view. A stand 10 has rigidly attached thereto a vertical support 12, which has a smooth exterior surface for easy sliding. Stand 10 and support 12 are preferably made from steel or iron casting. A tool assembly 15 is adjustably clamped about support 12, assembly 15 having a conventional locking mechanism 16 for clamping against support 12. Any known locking means may be used to provide an adjustable positioning of tool assembly 15 along the surface of support 12. A lever arm 18 is pivotally attached to a raised tab or in a slot on tool assembly 15 by means of a pivot pin 19. The other end of lever arm 18 is also pivotally attached by means of a suitable pin to handle 20, which may be manually raised and lowered. Handle 20 is preferably constructed from a U-channel member, and it has a pin 22 along its length passing between the U-members. Pin 22 is pivotally attached to one end of a plunger 30, which shaft is clamped against a triangular notch 24 or V-groove in tool assembly 15 by means of a flat clamping plate 23. Clamping plate 23 is attached to tool assembly 15 by means of bolts 26 and 27, which bolts are inserted through compression springs to provide a predetermined resistance to bolt rotation and thereby permit rotational settings at a plurality of positions.

Figure 2:
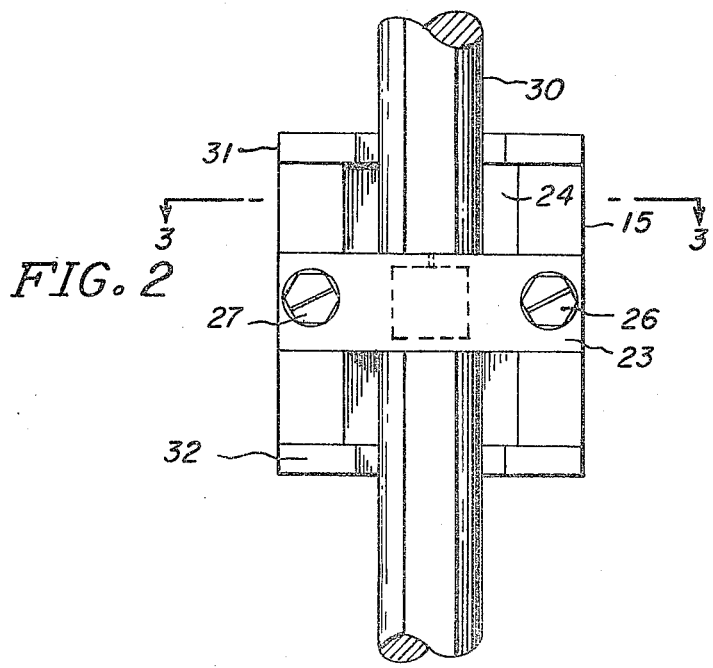
FIG. 2 is a partial front plan view of the tool assembly and plunger.

FIG. 2 illustrates a partial front plan view of tool assembly 15, showing plunger 30 and clamping plate 23. Tool assembly 15 preferably includes an upper plate 31 and a lower plate 32, constructed from aluminum, plastic or hardwood. It is desirable that the material be different than the material selected for plunger 30. Plunger 30 is preferably constructed of steel so as to have a hexagon cross section, or at least one flat surface to permit precision sliding and clamping. It is preferred that the V-groove 24 passing through tool assembly 15 be of somewhat larger size in the center portion of tool assembly 15, and being of a size exactly matching the shape of plunger 30 in upper plate 31 and lower plate 32.

Figure 3:
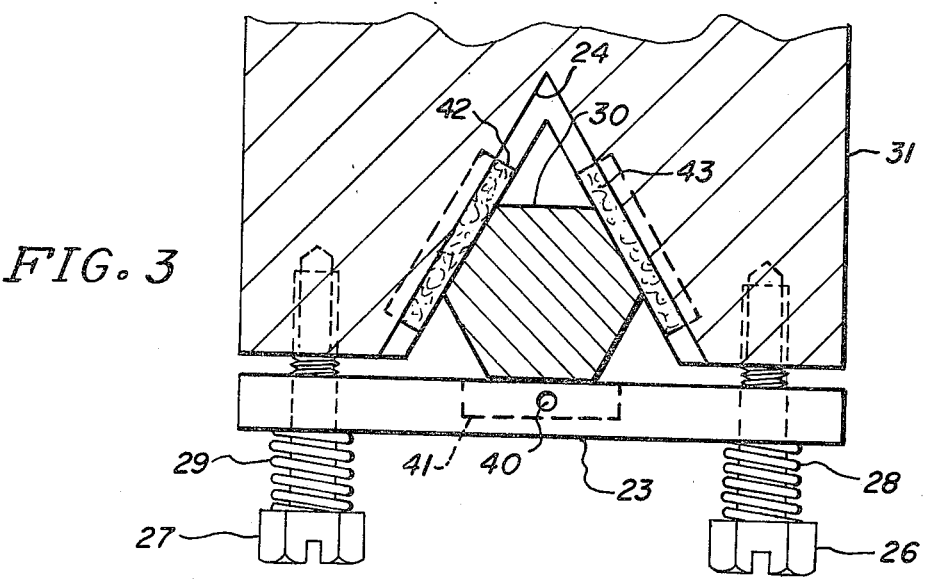
FIG. 3 is a top view taken along the lines 3—3 of FIG. 2.

FIG. 3 shows a partial top view of the invention taken along the line 3—3 of FIG. 2. Clamping plate 23 is adjustably clamped against an edge surface of plunger 30 by means of bolts 26 and 27. Compression springs 28 and 29 are respectively held between the head of bolts 26 and 27 and clamping plate 23 to permit variable bolt settings. The bolts are each threadably attachable to tool assembly 15. Compression springs 28 and 29 could alternatively be mounted within a cavity in tool assembly, with bolts 26 and 27 threadably attached adjacent the spring ends so that the compression springs resist bolt-turning forces. The V-grooves in plates 31 and 32 are sized to closely align against the edges of plunger 30, so that the tightening of bolts 26 and 27 causes plunger 30 to become uniformly clamped along three edge surfaces without affecting the lateral position of plunger 30. This configuration provides precise axial alignment of shaft 30 over widely varying clamping or frictional drag adjustments of clamping plate 23.

FIG. 3 also illustrates an oil fill hole 40 in the top edge of clamping plate 23. Oil fill hole 40 communicates with a packing 41 which is recessed into the surface of clamping plate 23 facing plunger 30. Similar packings 42 and 43 may be recessed into the facing surfaces of V-groove 24 against plunger 30 surfaces. The purpose of each of these packings is to provide an oil reservoir and lubrication means for plunger 30. A few drops of oil applied to these packings at infrequent intervals ensures the proper lubrication of plunger 30 and prevents excessive wear. The oil packings may be constructed of fiber material commonly used for this purpose.

Figure 4B:
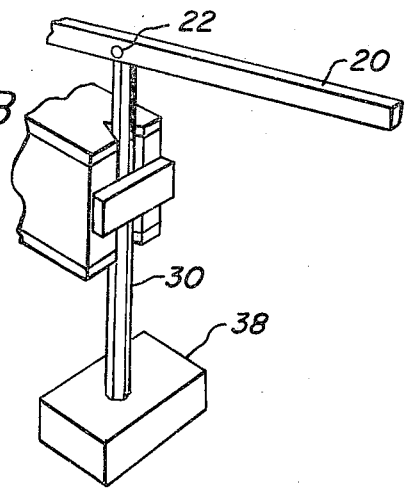
FIG. 4B shows the invention attached to a clamping fixture.
Figure 4D:
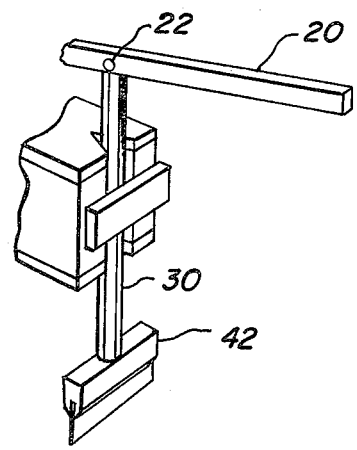
FIG. 4D shows the invention attached to a cutting tool.
Figure 4A:
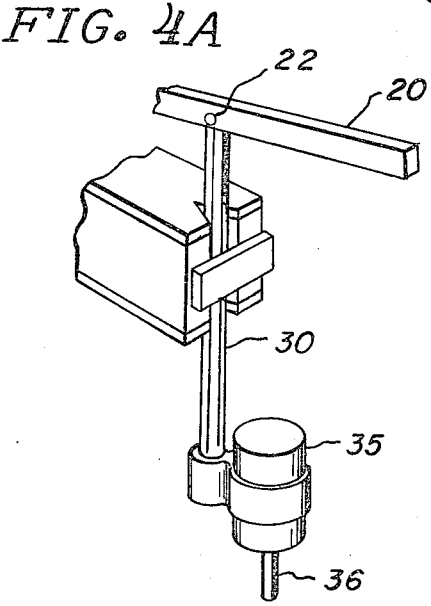
FIG. 4A shows the invention attached to a motor driven tool.

FIG. 4A illustrates one of the plurality of functional uses for the apparatus. An electric motor 35 is attached to plunger 30 for vertical reciprocation by handle 20. Electric motor shaft 36 may be coupled to a suitable drill chuck, cutting blade or grinding wheel in the position shown, or the motor may be rotated ninety degrees to provide a horizontal shaft position. In any event, drill chucks, grinding wheels, lathe chucks, saw blades or other tools may be attached to motor shaft 36, and vertical positioning may be easily and precisely controlled or fixed by means of handle 20 and bolts 26 and 27 while ensuring complete lateral stability.

FIG. 4B illustrates another use for the apparatus, wherein a bar 38 is attached to the bottom of plunger 30. Bar 38 may be raised or lowered under control of handle 20 to provide a clamping means or press according to the needs of the user.

Figure 4C:
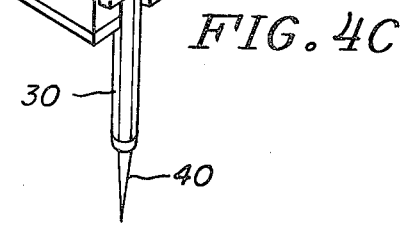
FIG. 4C shows the invention attached to a tapping or pounding tool.

FIG. 4C illustrates a further use of the apparatus, in that a penetrating tool 40 may be attached to the bottom of plunger 30. Tool 40 may take the form of a needle point or other patterned tip for punching or embossing as for example in the artful creation of designs for leather work.

FIG. 4D illustrates yet another purpose for the apparatus, wherein a cutting blade 42 is attached to plunger 30 to provide a precise cutting or chopping tool such as might be required for handcrafting or woodworking.

A plurality of other tools, jigs, and fixtures may be attached to plunger 30 to accomplish a multitude of work tasks which might be encountered in a workshop. Depending upon the work function being accomplished, clamping plate 23 may be adjustably tightened against the edge of plunger 30 to provide an adjustable degree of axial motion freedom. Plunger 30 is precisely aligned under three-point contact in both the horizontal plane as has been hereinbefore described, and also in the vertical plane, upper plate 31 securing two edges of plunger 30 in its V-groove, lower plate 31 securing two edges of plunger 30 in its V-groove, and clamping plate 23 bearing against an opposite edge of plunger 30 against the aforementioned V-grooves. This combination provides a fixed lateral positioning of plunger 30 while permitting variable axial freedom of movement. If it is desired that the plunger 30 be locked in any position bolts 26 and 27 may be secured against clamping plate 30, which in turn securely clamps against plunger to hold the plunger in a fixed position. In operation, the desired tool is secured to plunger 30 by means of a threaded tap in the end of shaft 30 or by other clamping means. Clamping plate 23 is adjustably clamped against the edge of plunger 30 to provide the proper degree of frictional resistance to axial motion. The workpiece is then placed on stand 10 and handle 20 is brought downwardly to bring the tool into contact with the workpiece. Handle 20 is raised and the workpiece moved to its next successive work position. The operation may be repeated indefinitely, the guiding V-grooves in tool assembly 15 providing precision locating points to eliminate lateral displacement of the end of plunger 30. Over time, and in the event of wear on plunger 30 or tool assembly 15, precision alignment control is maintained by merely adjusting the clamping force of clamping plate 23, for the V-grooves in tool assembly 15 continually provide a precision guide member for shaft movement.

The present invention may be embodied in other specific forms without departing from the spirit or essential attributes thereof, and it is therefore desired that the present embodiment be considered in all respects as illustrative and not restrictive reference being made to the appended claims rather than to the foregoing description to indicate the scope of the invention.

What is claimed is:

1. A multi-purpose tool for precision hand-operated reciprocation, comprising:
    (a) a tool stand having a support attached thereto;
    (b) a tool assembly clamped about said support for adjustable positioning thereon;
    (c) a notch cut through an edge of said tool assembly;
    (d) a plate bridging said notch, said plate being attached to said tool assembly by bolt and spring members to urge said plate toward said notch;
    (e) a top and bottom bearing plate, each having a triangular notch therein and each affixed to said tool assembly and respectively spaced apart with a triangular notch of each respectively aligned with said tool assembly notch;
    (f) a plunger having a first and second end and having a hexagonal cross section, said plunger being slidably movable between said bridging plate and said top and bottom bearing plates, two hexagon surfaces of said plunger contacting respective bearing plate triangular notches and one hexagon surface contacting said bridging plate, said plunger having its first end adapted for attachment to a tool;
    (g) a handle pivotally connected at one end to said tool assembly and pivotally connected along its length to said plunger second end; and
    (h) means for lubricating said plunger hexagon surface, said means being located in said bridging plate; whereby said bridging plate may be adjustably held against said plunger hexagon surface to provide variable resistance to said plunger slidable movement.

2. The apparatus of claim 1, wherein said means for lubricating further comprises an oil packing in said bridging plate.

3. The apparatus of claim 1, further comprising attachment means along said plunger for attaching to a tool.

4. The apparatus of claim 1, further comprising means for lubricating said plunger in said tool assembly notch.

* * * * *